United States Patent [19]

Ootsuka et al.

[11] Patent Number: 4,537,065
[45] Date of Patent: Aug. 27, 1985

[54] DEVICE FOR DETECTION OF ABNORMALITY IN PRESSURE DETECTOR FOR INTERNAL COMBUSTION ENGINE

[75] Inventors: Yoshinori Ootsuka; Tadashi Hattori; Minoru Yamamoto, all of Okazaki; Tadashi Ozaki, Gamagori, all of Japan

[73] Assignees: Nippon Soken, Inc., Nishio; Nippondenso Co., Ltd., Kariya, both of Japan

[21] Appl. No.: 575,996

[22] Filed: Feb. 1, 1984

[30] Foreign Application Priority Data

Feb. 3, 1983 [JP] Japan ................................ 58-15519

[51] Int. Cl.³ .......................................... G01M 15/00
[52] U.S. Cl. ..................................... 73/117.3; 73/4 R
[58] Field of Search ...................... 73/115, 117.3, 4 R, 73/116, 119 R, 118

[56] References Cited

U.S. PATENT DOCUMENTS 4,325,251 4/1982 Kanegae ........................ 73/117.3 X

FOREIGN PATENT DOCUMENTS 679839 8/1979 U.S.S.R. ............................. 73/117.3

*Primary Examiner*—Jerry W. Myracle
*Attorney, Agent, or Firm*—Cushman, Darby & Cushman

[57] ABSTRACT

A device for detecting an abnormality in a pressure detector in an internal combustion engine. This device includes a piezoelectric pressure detector, a timing detection unit, a selective connection unit, and an abnormality detection unit. The abnormality detection unit includes a capacitor connected to an oscillation circuit, and the piezoelectric pressure detector is connected in parallel with the series connection of the oscillation circuit and the capacitor.

8 Claims, 11 Drawing Figures

DEVICE FOR DETECTION OF ABNORMALITY IN PRESSURE DETECTOR FOR INTERNAL COMBUSTION ENGINE

BACKGROUND OF THE INVENTION

1. Field of the Invention

The present invention relates to a device for detecting an abnormality in a pressure detector in an internal combustion engine.

2. Description of the Prior Art

Various methods are used for controlling an internal combustion engine for an automotive vehicle. These include minimum spark advance angle control for best torque (MBT), control of the lean limit of the air-fuel ratio, knocking control, and the like. Various sensors are necessary to carry out the above control methods, and each of these methods uses a pressure sensor for sensing the combustion pressure in the engine, and a piezoelectric type pressure sensor is considered most suitable for this purpose.

The operation of a piezoelectric type pressure sensor is based on the phenomena wherein an electric charge is produced in response to the application of pressure.

When a piezoelectric pressure sensor is used in a high humidity atmosphere, the insulation resistance of the piezoelectric pressure element is reduced, and hence the output of the piezoelectric pressure sensor is reduced. Also, when the connection terminal or the cable of a piezoelectric pressure sensor is contaminated, the output of the piezoelectric pressure sensor is reduced. In addition, if there is a break in a connection related to a piezoelectric pressure sensor, the sensor is brought to an open state.

Hence, in any method for controlling the internal combustion engine wherein a piezoelectric pressure sensor is used, it is necessary to be able to detect any abnormality in the piezoelectric pressure sensor, i.e., a reduction of output or an open state. However, a satisfactory method or device for detecting abnormality in a piezoelectric pressure sensor has not been obtained as yet.

SUMMARY OF THE INVENTION

It is an object of the present invention to provide an improved device for detecting an abnormality in a pressure detector in an internal combustion engine, with a high precision.

It is another object of the present invention to carry out the detection of an abnormality in a pressure sensor by using the phenomena wherein the voltage at the junction of a pressure detector and a capacitor does not change even when the frequency is changed.

It is yet another object of the present invention to carry out the detection of an abnormality in a pressure sensor by using a clock signal for both the operation of the control circuit and the detection of the rotational speed of the engine.

It is a further object of the present invention to carry out the detection of an abnormality in a pressure sensor not only by the detection of the open state and the short-circuited state, but also by the detection of the intermediate state of deterioration in the pressure sensor.

According to the present invention, there is provided a device for detecting an abnormality in a pressure detector in an internal combustion engine including a piezoelectric type pressure detector, a timing detection unit having an angular position detector, a reference position detector, a timing calculation circuit for calculating the timing, a selective connection unit for carrying out the selective connection of the output terminal of the pressure detector, and an abnormality detection unit for receiving the output of the timing detection unit and one of the outputs of the selective connection unit. The abnormality detection unit includes a capacitor connected in series to an oscillation circuit. The pressure detector is connected in parallel with the series connection of the oscillation circuit and the capacitor.

DESCRIPTION OF THE PREFERRED EMBODIMENTS

Before proceeding to the explanation of the preferred embodiments, the principle of the operation of the device according to the present invention is described.

Since the impedance of a piezoelectric element is high, it is very difficult to determine the short-circuit status or the open status of a piezoelectric element by a method using DC voltage or current. Hence, it is necessary to construct the circuit shown in FIG. 1A in order to detect an abnormality in a piezoelectric element.

Figure 1A:
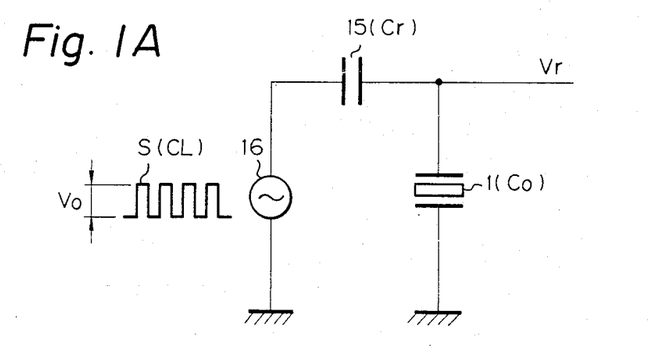
FIG. 1A illustrates a circuit explaining the principle of the present invention.

In the circuit shown in FIG. 1A, the capacitor 15 having the capacitor $C_r$ of, for example, hundreds of pico farads, which is approximately the same as the capacity $C_0$ of the piezoelectric element 1, is connected in series with the piezoelectric element 1. A clock signal $S(CL)$ of the voltage $V_0$ produced from the power source 16 is supplied to the series connected circuit of the piezoelectric element 1 and the capacitor 15.

In the circuit shown in FIG. 1A, the voltage $V_r$ at the junction 17 of the piezoelectric element 1 and the capacitor 15 is brought to the following states in accordance with the condition of the piezoelectric element.

(i) If the piezoelectric element 1 is in the normal condition:

$$V_r = C_0/(C_0 + C_r) \div \tfrac{1}{2} V_0$$

(ii) If the piezoelectric element 1 is in the short-circuit condition:

$$V_r \div 0$$

(iii) If the piezoelectric element 1 is in the open condition:

$$V_r \div V_0$$

Figure 1B:
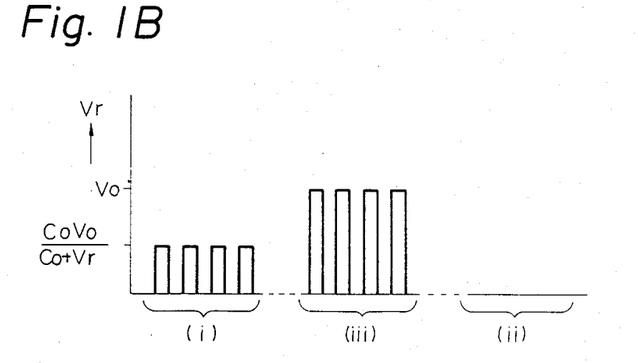
FIG. 1B illustrates the waveforms of the signal appearing in the circuit shown in FIG. 1A.

These three states are illustrated by the waveforms (i), (ii), and (iii) shown in FIG. 1B. Due to these three states, an abnormal state of the piezoelectric element 1 can be detected from the voltage $V_r$ at the junction 17.

Figure 1C:
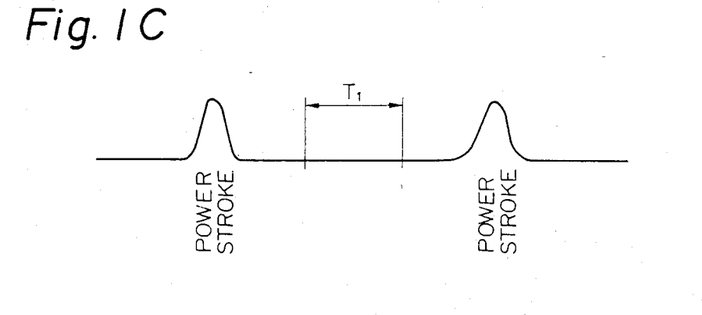
FIG. 1C is a time chart showing the measurement of the voltage $V_r$ in connection with the adjacent ignitions of the engine.

The detection of an abnormal state of the piezoelectric element 1 from the measurement of the voltage $V_r$ of the junction 17 is carried out in the period $T_1$ shown in FIG. 1C. The period $T_1$ is a portion of the interval between adjacent power strokes of the engine, and is the period for the exhaust stroke or the intake stroke. No control of the engine is carried out during the period $T_1$.

Figure 2A:
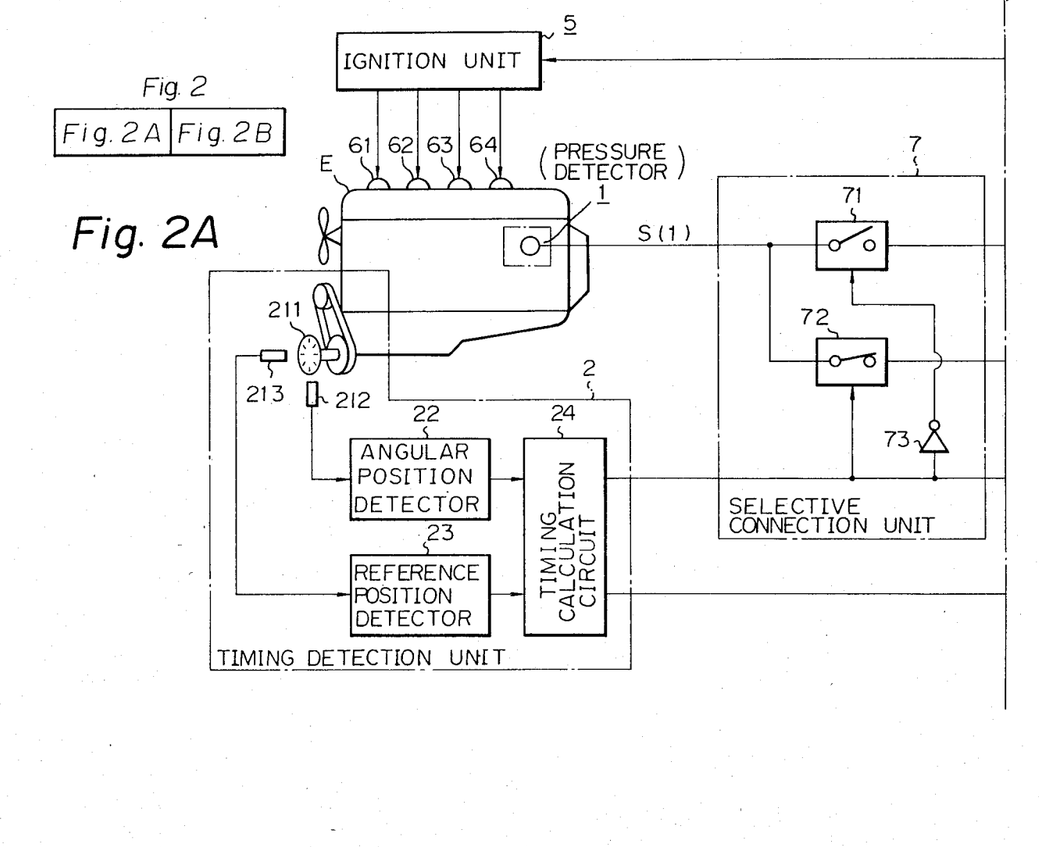
FIGS. 2A and 2B together illustrate a device for detecting an abnormality in a pressure detector in an internal combustion engine according to an embodiment of the present invention.
Figure 2B:
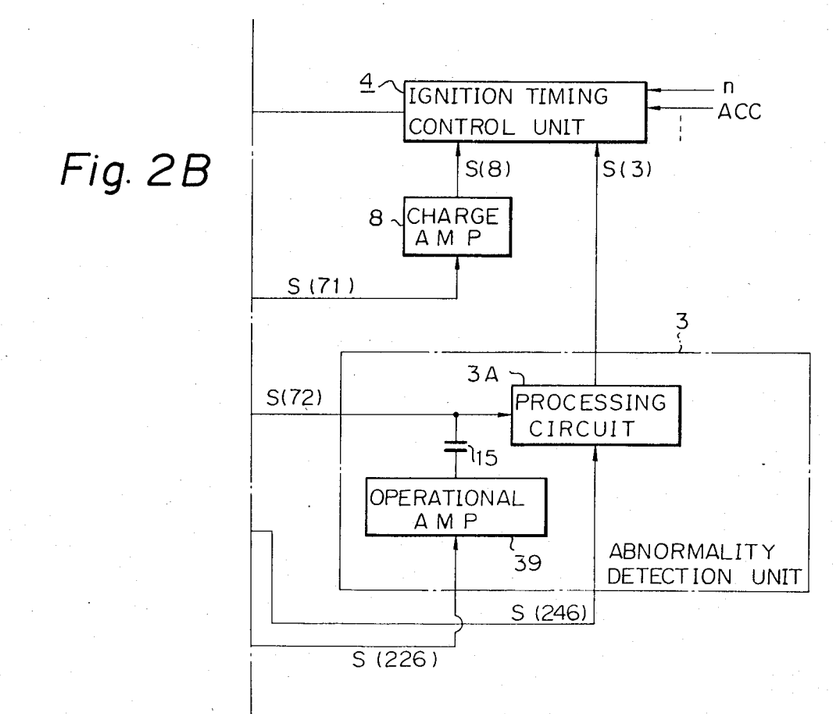

A device for detecting an abnormality in a pressure detector in an internal combustion engine according to an embodiment of the present invention is illustrated in FIG. 2.

The device shown in FIG. 2 includes a four-cylinder gasoline engine E, a pressure detector 1, a timing detection unit 2, an abnormality detection unit 3, an ignition timing control unit 4, an ignition unit 5, ignition plugs 61, 62, 63, and 64, a selective connection unit 7, and a charge amplifier 8.

The timing detection circuit 2 includes a rotor 211 with projections which rotates once per two rotations of the crankshaft, an angular position detector 22, a reference position detector 23, and a timing calculation circuit 24.

Figure 3:
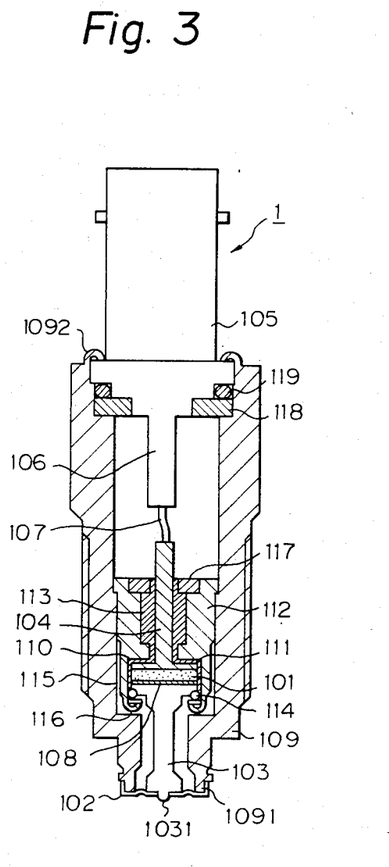
FIG. 3 illustrates the structure of a pressure detector used in the device shown in FIG. 2A.

An example of the pressure detector 1 used in the device shown in FIG. 2 is illustrated in FIG. 3. In the pressure detector 1, a pressure receiving column 103, as a pressure transmission body, is provided between a piezoelectric element 101 and a diaphragm 102. An output electrode 104 is connected to a terminal 106 of a connector 105 via a lead wire 107. A ground electrode 108 is connected to a housing 109 via the pressure receiving column 103 and the diaphragm 102. Insulators 110 and 111 insulate the piezoelectric element 101 from a sensor body 112. An insulator 113 insulates the output electrode 104 from the sensor body 112.

The process of the construction of the sensor assembly is as follows. First, the insulator 110, the output electrode 104, the piezoelectric element 101, the pressure receiving column 103, and the insulator 111 are introduced into the sensor body 112 through the lower opening in the body. Then, the clamping portion 116 of the sensor body 112 is pressed over the peripheral edge of the pressure receiving column 103 so that the piezoelectric element 101 and the pressure receiving column 103 are fixed to the sensor body 112. The insulator 113 is then introduced through the upper opening of the sensor body 112, and a spacer 117 is fitted to the insulator 113, thus completing the construction of the sensor assembly. Pressure is exerted on the piezoelectric element 101 by a resilient metal ring 114.

The sensor assembly is pressed into the housing 109, and the diaphragm 102 is welded to the end 1031 of the pressure receiving column 103 and the end 1091 of the housing 109.

The clamping portion 1092 of the housing 109 is pressed against the connector 105, which rests on a spacer 118 and an O ring 119, so that the connector 105 is fixed to the housing 109.

The thus constructed pressure detector 1 produces the signal S(1) representing the change of pressure per time dP/dt, due to the characteristic of the piezoelectric element 101 in the pressure detector 1.

Figures 4, 4A:
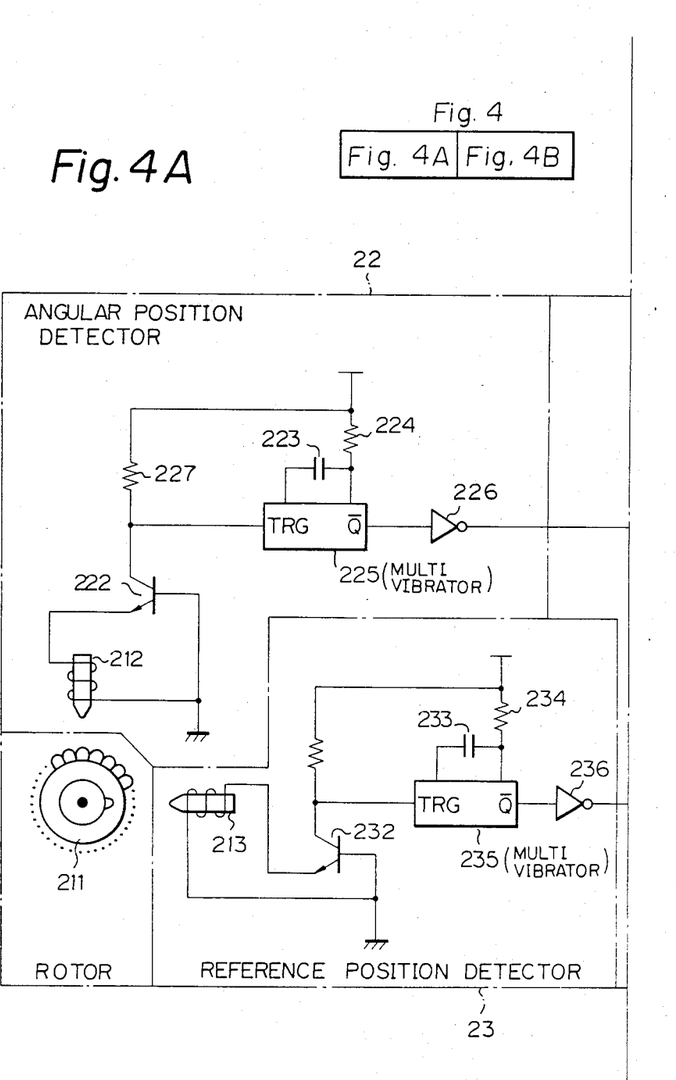
FIGS. 4A and 4B together illustrate the timing detection circuit used in the device shown in FIG. 2A.
Figure 4B:
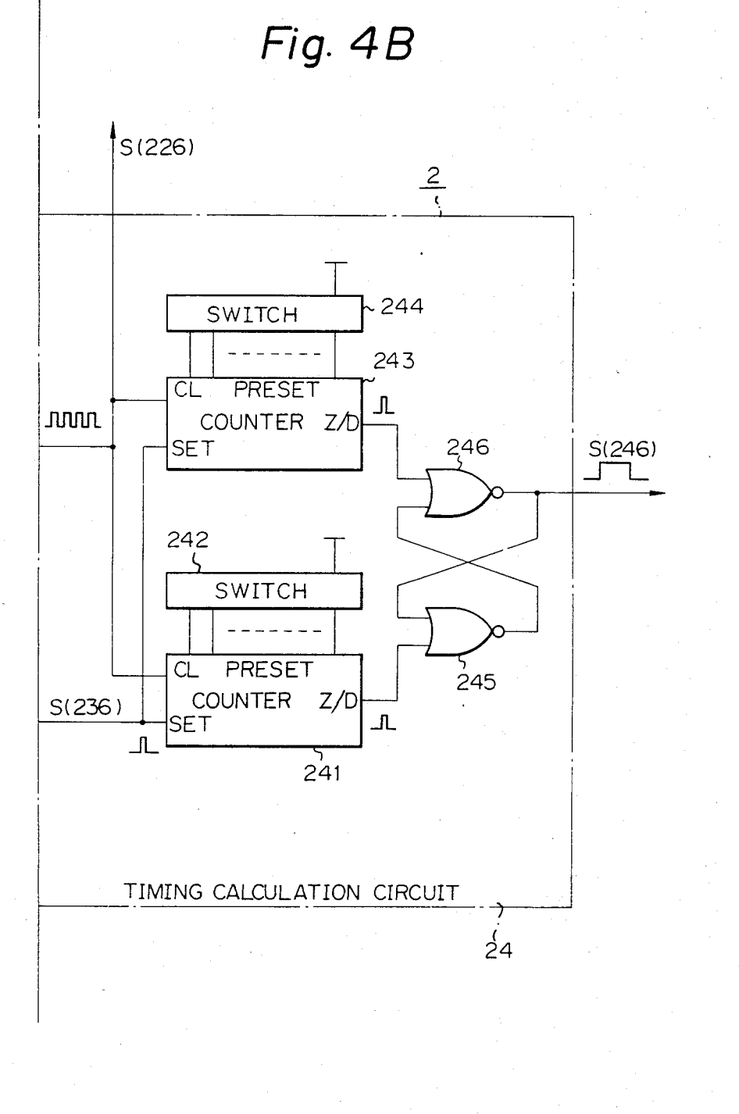

The structure of the timing detection circuit 2 is shown in FIG. 4. In an angle position detection device 22, pulses of a predetermined number, for example, 100, each of the pulses having a predetermined pulse width, are produced, and the produced pulses are used for detecting the angle of rotation of the crankshaft.

In the reference position detection device 23, a pulse having a predetermined pulse width is produced per each rotation of the crankshaft, which pulse is used for detecting the reference position.

A timing calculation circuit 24 produces a signal S(246), for deciding the ON or OFF status of analog switches 71 and 72, and a clock signal S(226) of a high frequency of, for example, several KHz. The clock signal S(226) is used also for detecting the rotation rate n of the engine.

The timing calculation circuit 24 includes down counters 241 and 243, and piano switch type switch assemblies 242 and 244. The switch assemblies 242 and 244 carry out the setting of only the preselected inputs, which are JAM inputs, to HIGH level.

In the down counters 241 and 243, the setting of the preset input is carried out in response to the leading edge of the output signal S(236) of the reference position detection device 23, a predetermined value is set to the counter, and the down counting of the clock signals is started in response to the trailing edge of the output signal S(236). When the count at the counter becomes zero, a HIGH potential signal is produced from the Z/D terminal of the down counters 241 and 243. NOR gates 245 and 246 which form a flip-flop circuit are also provided.

Figure 6:
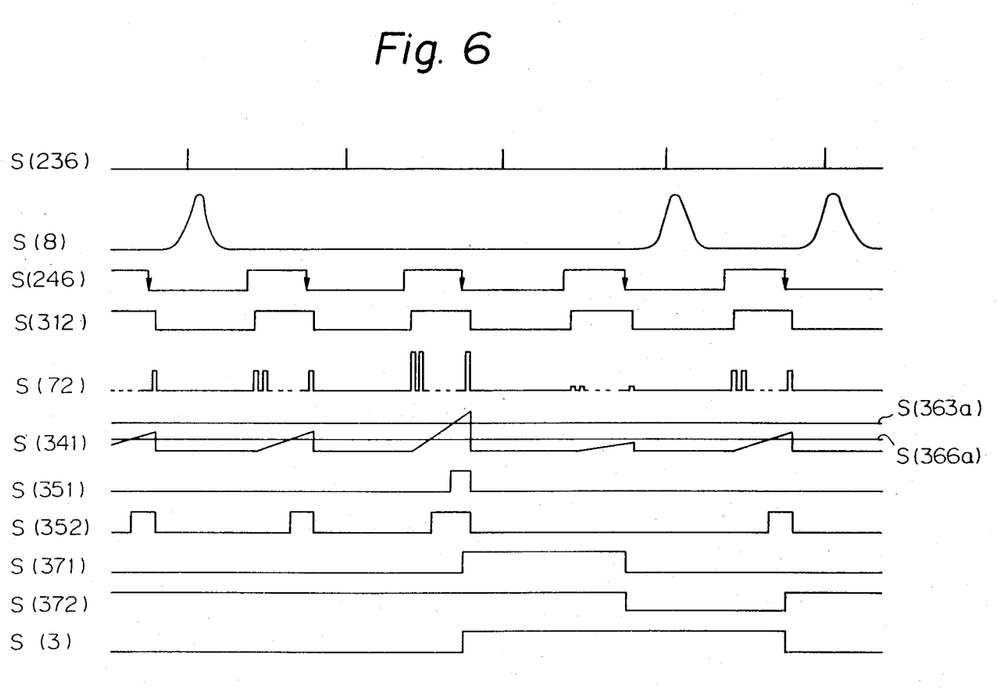
FIG. 6 shows the waveforms of the signals appearing in the portions of the device shown in FIGS. 2A and 2B.

The operation of the timing detection signal 2 is as follows. In response to the leading edge of the reference position signal S(236) the counters 241 and 243 are reset, and in response to the trailing edge of the reference position signal S(236) the preselected inputs are set and the counting down in the counter is started. When the count of the counter become zero, a pulse is produced from the Z/D terminal of the counter 241 and the flip-flop circuit 245, 246 is set. A pulse is then produced from the Z/D terminal of the counter 242, and the flip-flop circuit 245, 246 is reset to produce the signal S(246), as illustrated in FIG. 6. The potential of the signal S(246) is HIGH during the exhaust and intake strokes and LOW during the compression and power strokes.

Figures 5, 5A:
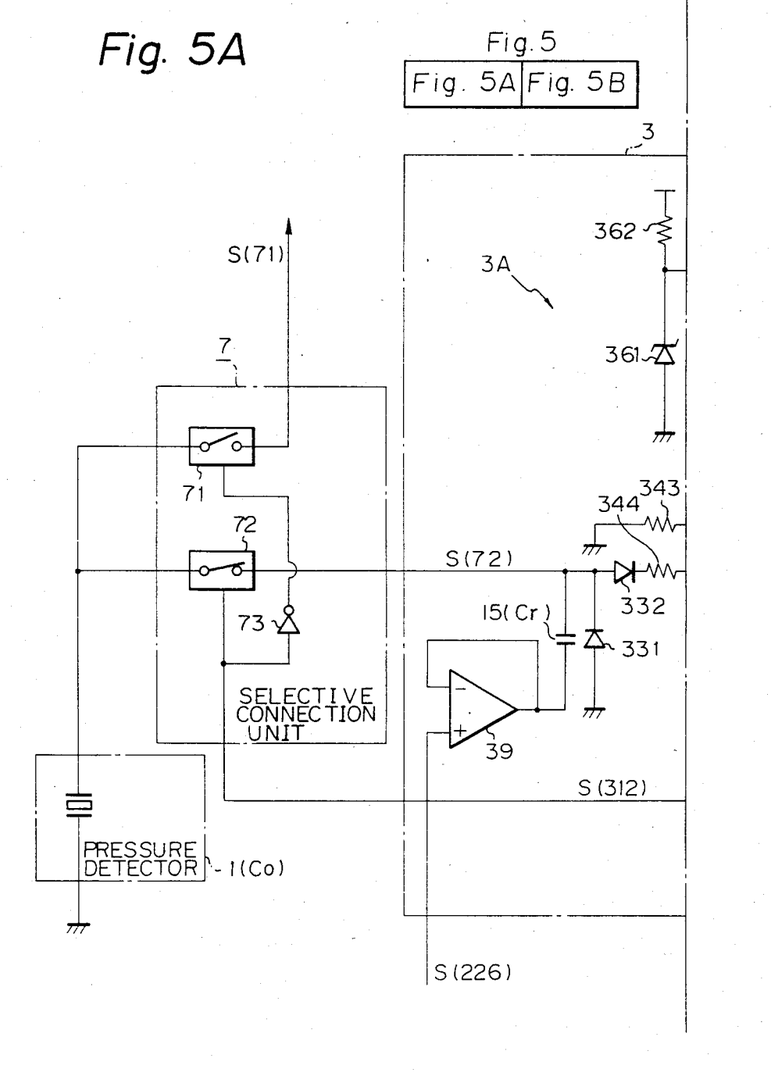
FIGS. 5A and 5B together illustrate the selective connection unit and the abnormality detection unit in the device shown in FIG. 2B.
Figure 5B:
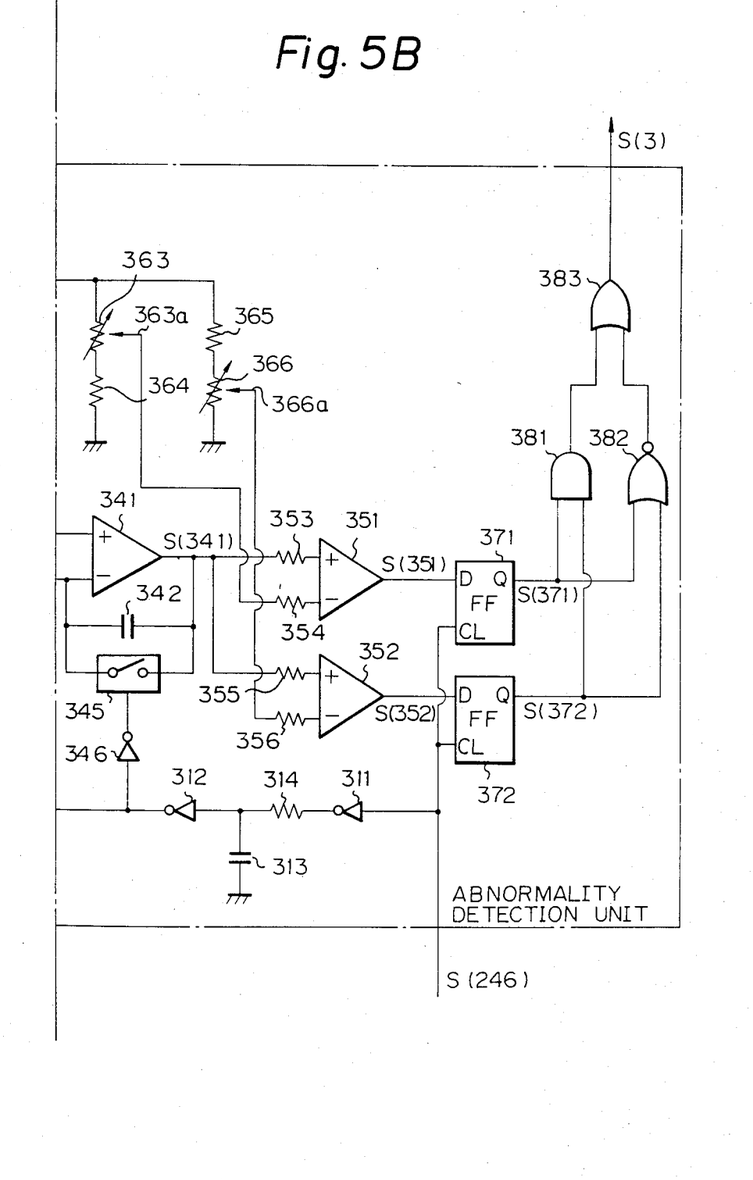

The structure of the selective connection unit 7 and the abnormality detection unit 3 is shown in FIG. 5. The selective connection unit 7 includes analog switches 71 and 72, and an inverter 73. One terminal of each of the analog switches 71 and 72 is connected to one terminal of the pressure detector 1, which is expressed equivalently as a capacitor having the capacitance $C_0$.

In the abnormality detection unit 3 there are provided inverters 311 and 312, a capacitor 15, diodes 331 and 332, an operational amplifier 341 (as a constituent of a Miller integrator), an analog switch 345, an inverter 346, operational amplifiers 351 and 352 (as the comparators), a Zener diode 361, a fixed resistor 364 and a variable resistor 363 for producing a reference voltage S(363a), a fixed resistor 365 and a variable resistor 366 for producing a reference voltage S(366a), flip-flop circuits 371 and 372, an AND gate 381, a NOR gate 382, and an OR gate 383.

The circuit consisting of a resistor 314 and a capacitor 313 delays the signal S(246) to produce the signal S(312). Through the signal S(312), the analog switch 72 is switched ON and the analog switch 71 is switched OFF, during the exhaust and intake strokes, and the analog switch 72 is switched OFF and the analog switch 71 is switched ON during the compression and power strokes. Thus, the output of the pressure detector is supplied to the abnormality detection unit 3 during the exhaust and intake processes, and is supplied to the ignition timing control unit 4 during the compression and power strokes.

The clock signal S(226) is supplied via the operational amplifier 39, which operates as a follower, and the capacitor 15 to the pressure detector 1.

When the potential of the signal S(312) is HIGH, the analog switch 345 is in the OFF state. The integration of the voltage $V_r$ of the signal S(72) is started by the Miller integrator containing the operational amplifier 341, to produce a DC voltage signal S(341).

A reference voltage signal S(363a) for the detection of the open state is produced from the variable terminal of the resistor 363, while a reference voltage signal S(366a) for the detection of the shortcircuited state is produced from the variable terminal of the resistor 366. The resistors 353 to 356 are provided for protection.

Where the output S(341) of the operational amplifier 341 is greater than the reference voltage S(363a) for the detection of the open state, that is in the abnormal state, the signal S(351) having a HIGH potential is produced. While, where the output S(341) is greater than the reference voltage S(366a) for the detection of the shortcircuited state, that is in the normal state, the signal S(352) having a LOW potential is produced.

The signals S(351) and S(352) are set in the flip-flop circuits 371 and 372, in response to the leading edge of the signal S(246), to produce the output signals S(371) and S(372).

Where either the potential of S(371) is HIGH or the potential of S(371) is LOW, that is in the abnormal state, an output signal S(3) having a HIGH potential is produced from the OR gate 383.

The waveforms of the signals appearing in the portions of the device shown in FIG. 2 are shown in FIG. 6. FIG. 3 shows the waveforms of the TDC signal S(243), the output signal S(8) of the charge amplifier 8, the output signal S(246) of the flip-flop circuit 245, 246, the output signal S(312) of the inverter 312, the output signal S(72) of the analog switch 72, the output signal S(341) of the operational amplifier 341, the output signal S(351) of the operational amplifier 351, the output signal S(352) of the operational amplifier 352, the output signal S(371) of the flip-flop circuit 371, the output signal S(372) of the flip-flop circuit 372, and the output signal S(3) of the abnormality detection unit 3.

Assuming that the internal combustion engine E in FIG. 2 is a gasoline engine, the operation of the device shown in FIG. 2 will be described. During the compression and power strokes, the analog switch 71 is in the ON state while the analog switch 72 is in the OFF state, and hence, the output of the pressure detector 1 is supplied to the ignition timing control unit 4, and accordingly, the control of, for example, P(MAX)/P(m), $\theta$(P·MAX), or the like, is carried out.

During the exhaust and intake strokes, the analog switch 71 is in the OFF state while the analog switch 72 is in the ON state. In this case, no output of the pressure detector 1 is supplied to the ignition, but the high frequency clock signals from the timing detection circuit 2 are supplied via the operational amplifier 39 and the capacitor 15, and hence, the abnormality of the pressure detector 1 is detected on the basis of the waveform of the signal S(72).

When the operation of the pressure detector 1 is normal and the potential of the abnormality detection unit 3 is LOW, the ignition timing control circuit 4 decides the fundamental advance angle amount on the basis of the rotational speed n and the opening degree ACC of the accelerator, and calculates the correction advance angle amount on the basis of the waveform of the output of the pressure detector 1, and hence, the signal for "fundamental advance angle amount+correction advance angle amount" is produced and supplied to the ignition unit 5.

If the pressure detector 1 is in the abnormal state, such as the OFF state, the short-circuited state, or the like, the potential of the output signal of the abnormality detection unit 3 becomes HIGH, and the calculation of the correction advance angle amount is prevented, so that only the signal of the fundamental advance angle amount is supplied to the ignition unit 5.

Although the preferred embodiment of the present invention is described heretofore, it will be understood that various modifications and alterations are possible without departing from the scope of the present invention. For example, although the above description is mainly concerned with the gasoline engine, it is possible to apply the present invention to a diesel engine. In the case of a diesel engine, a unit for controlling the fuel injection timing or amount is used instead of the above-described ignition timing control unit, a fuel injection pump is used instead of the above-described ignition unit, and a fuel injection nozzle is used instead of the above-described ignition plugs.

In the above-described alternative embodiment of the present invention for a diesel engine, the device for controlling the fuel injection calculates the fuel injection amount and the fundamental injection timing on the basis of the rotational rate, the opening degree of the accelerator, and the like. When the pressure detector 1 is in a normal state, the potential of the output signal of the abnormality detection unit 3 is LOW, the correction fuel injection timing is calculated on the basis of the output signal of the pressure detector 1, and the signals for the fuel injection amount i.e., the "fundamental fuel injection timing+correction fuel injection timing", are supplied to the fuel injection device. Where an abnormality in the pressure detector is detected, the potential of the output signal of the abnormality detection unit becomes HIGH, and hence, the calculation of the correction fuel injection timing calculation is prevented, and accordingly, only the signals of the fuel injection amount and the fundamental fuel injection timing are supplied to the fuel injection device.

Although the clock signals are supplied to the capacitor 15 in the above-described embodiment, it is also possible to supply signals generated from an ordinary oscillation source with a predetermined constant frequency.

We claim:
1. A device for detecting an abnormality in a pressure detector in an internal combustion engine comprising: a piezoelectric type pressure detector;

a timing detection means having an angular position detector, a reference position detector, and a timing calculation circuit for calculating the timing;

a selective connection means for carrying out the selective connection of the output terminal of said pressure detector; and an abnormality detection means for receiving the output of said timing detection means and one of the outputs of said selective connection means, said abnormality detection means including a capacitor connected in series to an oscillation circuit, said pressure detector being connected in parallel with the series connection of said oscillation circuit and said capacitor.

2. A device according to claim 1, wherein the timing of the operation of said selective connection means is selected in such a manner that the output terminal of said pressure detector is connected to said abnormality detection circuit during the exhaust or the intake stroke of the cylinder of said internal combustion engine in which said pressure detector is arranged.

3. A device according to claim 1, wherein said oscillation circuit includes an angular position detector, clock signals generated by said angular position detector being supplied to said capacitor are also used for the detection of the rotation rate of said internal combustion engine.

4. A device according to claim 1, wherein said selective connection means comprises analog switches and an inverter.

5. A device according to claim 1, wherein said abnormality detection means comprises an operational amplifier as a constituent of a Miller integrator.

6. A device according to claim 1, wherein said abnormaliy detection means comprises operational amplifiers as the comparators.

7. A device according to claim 1, wherein said abnormality detection means comprises a circuit consisting of a resistor and capacitor for delaying a supplied signal.

8. A device according to claim 1, wherein said abnormality detection means comprises flip-flop circuits, the outputs of said flip-flop circuits being supplied to an AND gate and a NOR gate, and the outputs of said AND gate and said NOR gate are supplied to an OR gate to produce the output of said abnormality detection means.

* * * * *